(12) United States Patent
Kuwajima et al.

(10) Patent No.: US 6,178,156 B1
(45) Date of Patent: Jan. 23, 2001

(54) DISK RECORDING AND REPRODUCTION APPARATUS AND DYNAMIC DAMPER THEREOF

(75) Inventors: Hideki Kuwajima, Kyoto; Hirotaka Okamoto, Osaka, both of (JP)

(73) Assignee: Matsushita Electric Industrial Co., Ltd., Osaka-Fu (JP)

( * ) Notice: Under 35 U.S.C. 154(b), the term of this patent shall be extended for 0 days.

(21) Appl. No.: 09/092,401

(22) Filed: Jun. 5, 1998

(30) Foreign Application Priority Data

Jun. 9, 1997 (JP) .................................................. 9-151191

(51) Int. Cl.⁷ .................................................. G11B 33/08
(52) U.S. Cl. .................................................. 369/263
(58) Field of Search ............................... 369/263; 248/562

(56) References Cited

U.S. PATENT DOCUMENTS

| 4,466,034 | * | 8/1984 | Newberry | 360/106 |
| 5,323,211 | * | 6/1994 | Fujii et al. | 399/167 |
| 5,843,264 | * | 12/1998 | Mabuchi et al. | 156/245 |
| 5,884,902 | * | 3/1999 | Hamada et al. | 267/141 |

FOREIGN PATENT DOCUMENTS

| 195 24 948 A1 | 1/1996 | (DE) . |
| 1050638 | 1/1954 | (FR) . |
| 2165918A | 4/1986 | (GB) . |
| 63-25797 | 10/1988 | (JP) . |
| WO 87/02498 | 4/1987 | (WO) . |
| WO 91/00967 | 1/1991 | (WO) . |
| WO 93/08414 | 4/1993 | (WO) . |
| WO 94/02755 | 2/1994 | (WO) . |

\* cited by examiner

*Primary Examiner*—David L. Ometz
*Assistant Examiner*—Angel Castro
(74) *Attorney, Agent, or Firm*—Akin, Gump, Strauss, Hauer & Feld, L.L.P.

(57) ABSTRACT

The dynamic damper for use in the disk recording and reproduction apparatus of the present invention is provided with a cylindrical weight sandwiched between a pair of gel members, a rod secured to the weight is inserted into through holes formed in the gel members disposed on both sides of the weight, and the weight is supported by a holder via the gel members. Since the holder is installed on the substrate of the disk recording and reproduction apparatus so that the center axis of the weight is orthogonal to the movement direction of the optical pickup thereof, the head positioning accuracy in the disk recording and reproduction apparatus can be improved, whereby the disk recording and reproduction apparatus can have an excellent vibration damping effect during disturbance vibration.

4 Claims, 6 Drawing Sheets

DISK RECORDING AND REPRODUCTION APPARATUS AND DYNAMIC DAMPER THEREOF

BACKGROUND OF THE INVENTION

The present invention relates to a disk recording and reproduction apparatus for recording and reproducing information to and from a disk used as a recording medium. More particularly, it relates to a dynamic damper for damping vibration in a disk recording and reproduction apparatus which positions its head by linearly moving the head in the radial direction of the disk.

As having been disclosed in Japanese Laid-open Patent Application, Publication No. Hei 2-292781 for the invention of "A voice-coil type optical head" for example, a conventional disk recording and reproduction apparatus comprises a disk drive mechanism for supporting and rotating a disk used as a recording medium, an optical head for writing and reading information to and from the disk, and a positioning mechanism for positioning the optical head. The conventional disk recording and reproduction apparatus having been configured as described above is provided with a dynamic damper having a function to damp vibration in a specific direction so that the optical head can be accurately positioned at a target track on the disk.

The dynamic damper of the conventional disk recording and reproduction apparatus disclosed in Japanese Laid-open Patent Application, Publication No. Hei 2-292781 comprises a weight having a large mass and an elastic element. The weight is bonded to the elastic element which is fixed to a member whose vibration is to be damped. By using the dynamic damper being configured described above, the conventional disk recording and reproduction apparatus damp vibration from the drive mechanism to some extent, to improve the positioning accuracy of the optical head.

Generally speaking, with an increase in the mass of a dynamic damper, a frequency range of vibration to be damped becomes wide. However, it is very difficult to bond a weight having a large mass to an elastic element having a viscosity, in particular, a gel material. For this reason, the frequency range of vibration to be damped cannot be made wider, thereby causing a problem in product reliability.

In addition, in the above-mentioned conventional configuration, it is necessary to install a dynamic damper in each direction of vibration to be damped, thereby causing a problem of making the apparatus larger and heavier.

BRIEF SUMMARY OF THE INVENTION

In order to solve the above-mentioned problems, an object of the present invention is to provide a dynamic damper capable of damping vibration in a wide frequency range by using a simple configuration, and to provide a disk recording and reproduction apparatus using the dynamic damper. In addition, another object of the present invention is to provide a dynamic damper capable of delivering an excellent damping effect for vibration in any directions, for example, in the directions of three axes (X, Y and Z axes) which fall at right angles with respect to each other, and to provide a disk recording and reproduction apparatus using the dynamic damper.

In order to attain the above-mentioned objects, the dynamic damper of the present invention comprises:

a weight having a predetermined mass;

a pair of viscoelastic elements having a predetermined spring constant and a predetermined viscosity and used to support the weight; and a holder for securing the weight onto a substrate via the viscoelastic elements, said dynamic damper being configured to damp vibration in a frequency range lower than a resonance frequency determined by the spring constant of the viscoelastic elements and the mass of the weight.

Furthermore, in the dynamic damper of the present invention, the weight is sandwiched between the pair of viscoelastic elements.

With this configuration of the dynamic damper of the present invention, a weight having a large mass for the dynamic damper can be set easily, and a frequency range of vibration to be damped can be made wider.

Furthermore, in the dynamic damper of the present invention, the viscoelastic elements are formed in a plate shape and each have a through hole at the center of the flat surface thereof, the weight is formed in a cylindrical shape, and the through holes of the viscoelastic elements are passed through by a rod secured to the center axis of the weight. With this configuration of the dynamic damper of the present invention, a weight having a large mass can be attached to the viscoelastic elements easily and securely.

Furthermore, in the dynamic damper of the present invention, the holder is installed on the substrate so that the center axis of the weight is orthogonal to the line segment extended between the rotation center of a disk and the operating point of a head for writing and reading information on and from the disk. With this configuration of the dynamic damper of the present invention, the highest damping effect can be delivered.

Furthermore, the dynamic damper of the present invention comprises:

a spherical weight having a predetermined mass;

six rods projecting radially from the weight at equal intervals;

a set of viscoelastic elements having a predetermined spring constant and a predetermined viscosity, being passed through by the rods and used to elastically support the weight; and a substrate for supporting the weight via the viscoelastic elements, said dynamic damper being configured to damp vibration in a frequency range lower than a resonance frequency determined by the spring constant of the viscoelastic elements and the mass of the weight.

With this configuration of the dynamic damper of the present invention, a weight having a large mass for the dynamic damper can be set easily, and a vibration damping effect can be obtaining in any directions.

Furthermore, the dynamic damper of the present invention comprises:

a weight having a predetermined mass;

a first viscoelastic element having a predetermined spring constant and a predetermined viscosity, a second viscoelastic element having a spring constant and a viscosity different from those of the first viscoelastic element, and used together with the first viscoelastic element to support the weight; and a holder for securing the weight onto a substrate via the first and second viscoelastic elements, dynamic damper being configured to damp vibration in a frequency range lower than a resonance frequency determined by the spring constants of the first and second viscoelastic elements and the mass of the weight.

With this configuration of the dynamic damper of the present invention, a weight having a large mass for the dynamic damper can be set easily, and a vibration damping effect can be obtaining in any directions.

In order to attain the above-mentioned objects, the disk recording and reproduction apparatus of the present invention comprises:

a disk used as a recording medium;

a disk drive mechanism for supporting and driving the disk;

a head for writing and reading information to and from the disk;

a head positioning mechanism for moving the head in the radial direction of the disk;

a substrate for supporting the disk drive mechanism and the head positioning mechanism; and a dynamic damper including a weight having a predetermined mass, a set of viscoelastic elements having a predetermined spring constant and a predetermined viscosity and used to support the weight, and a holder for securing the weight onto the substrate via the viscoelastic elements, said disk recording and reproduction apparatus being configured to damp vibration in a frequency range lower than a resonance frequency determined by the spring constant of the viscoelastic elements and the mass of the weight by using the dynamic damper.

With this configuration of the disk recording and reproduction apparatus of the present invention, a weight having a large mass for the dynamic damper can be set easily, and a frequency range of vibration to be damped can be made wider.

Furthermore, the disk recording and reproduction apparatus of the present invention comprises:

a disk used as a recording medium;

a disk drive mechanism for supporting and driving the disk;

a head for writing and reading information to and from the disk;

a head positioning mechanism for moving the head in the radial direction of the disk;

a dynamic damper including a spherical weight having a predetermined mass, six rods projecting radially from the weight at equal intervals, and a set of viscoelastic elements having a predetermined spring constant and a predetermined viscosity, being passed through by the rods and used to elastically support the weight; and a substrate for supporting the disk drive mechanism, the head positioning mechanism and the dynamic damper, said disk recording and reproduction apparatus being configured to damp vibration in a frequency range lower than a resonance frequency determined by the spring constant of the viscoelastic elements and the mass of the weight.

With this configuration of the disk recording and reproduction apparatus of the present invention, a weight having a large mass for the dynamic damper can be set easily, and a vibration damping effect can be obtained in any directions.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Embodiment 1 and embodiment 2 of the disk recording and reproduction apparatus of the present invention will be described below referring to the accompanying drawings.

Embodiment 1

Figure 1:
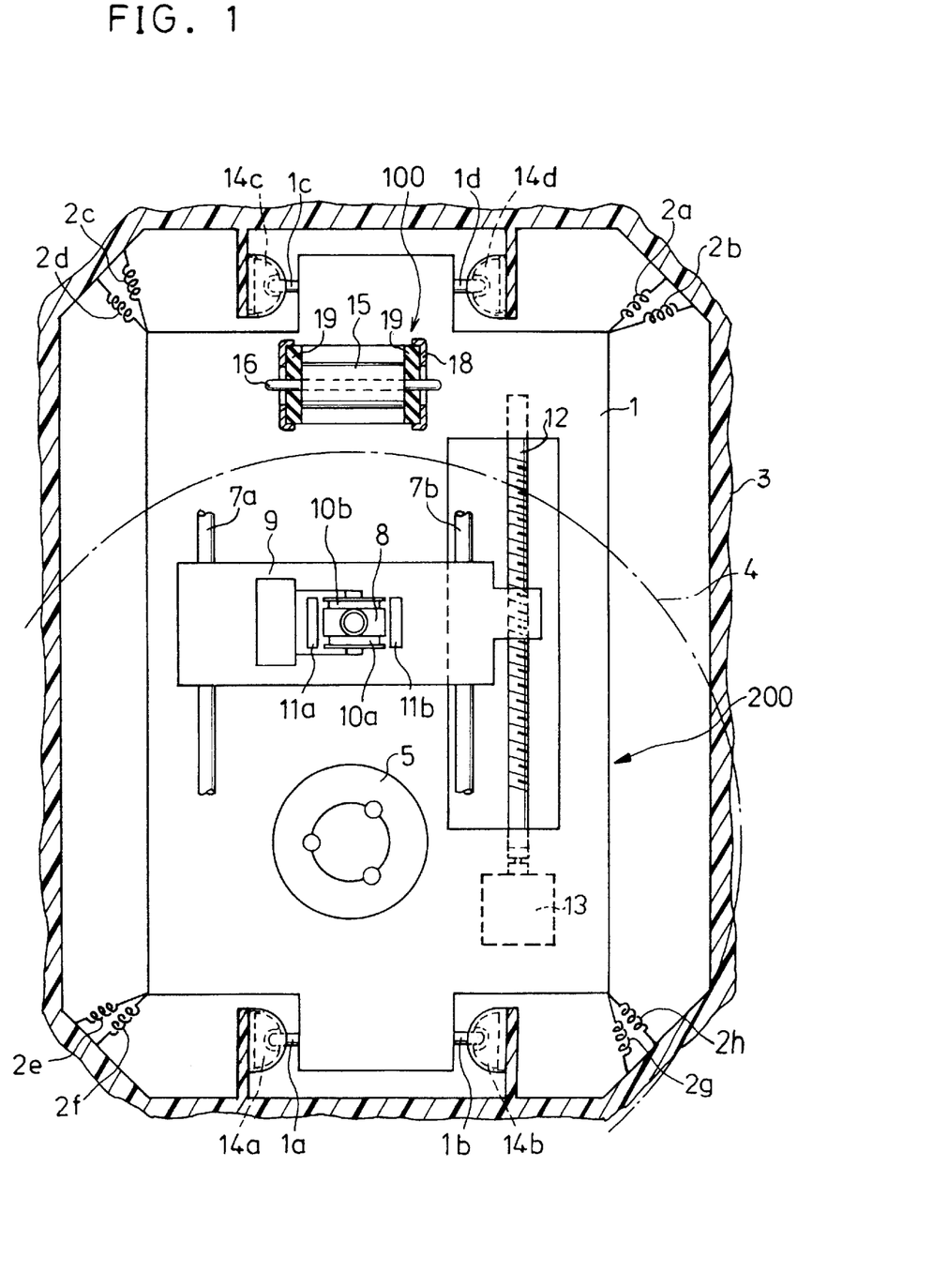
FIG. 1 is a schematic plan view showing a disk recording and reproduction apparatus in accordance with embodiment 1 of the present invention.
Figure 2:
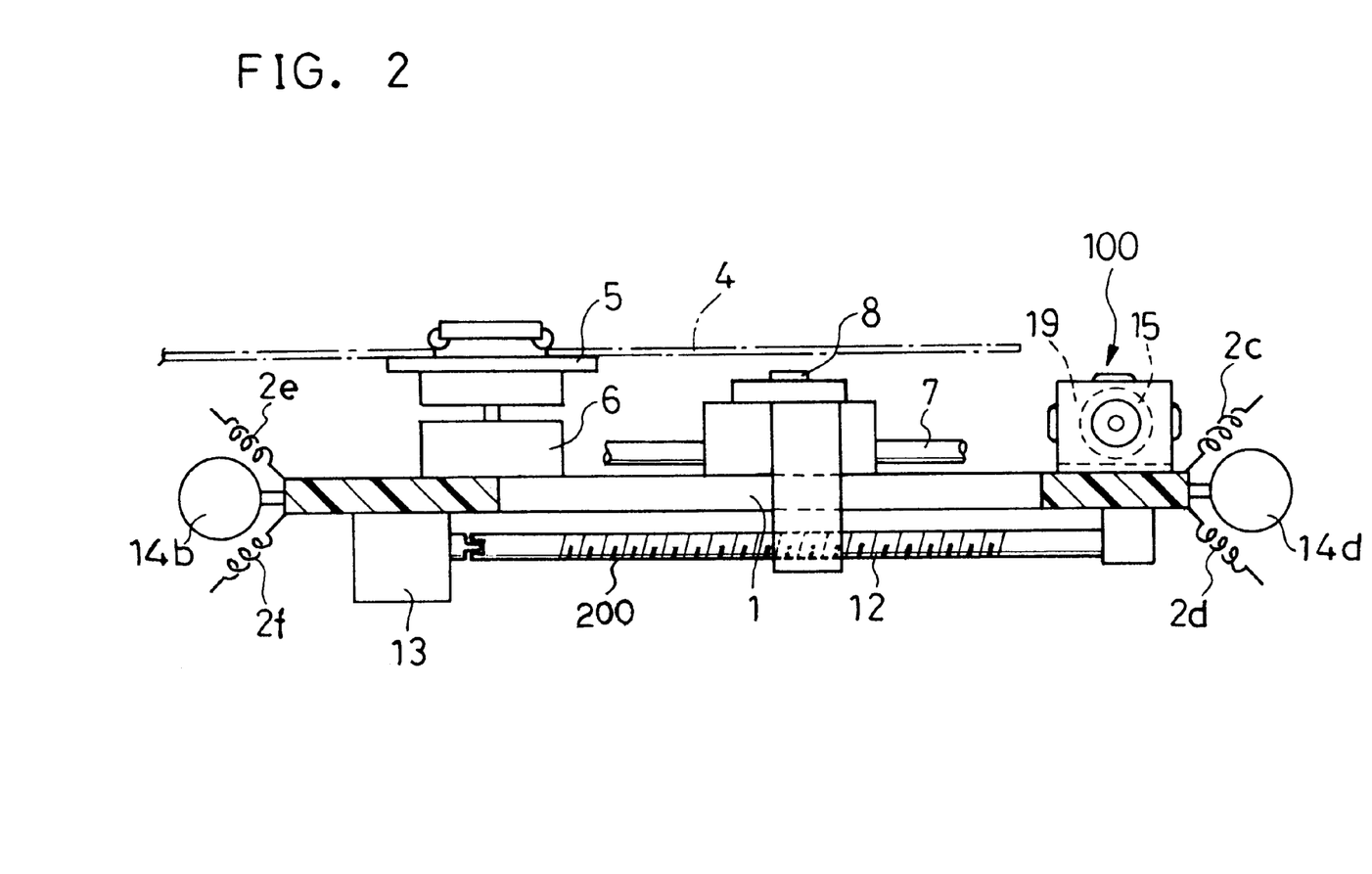
FIG. 2 is a side view showing a floating unit in a disk recording and reproduction apparatus in accordance with embodiment 1.

FIG. 1 is a schematic plan view showing a floating unit 200 comprising therein a disk drive mechanism, a drive mechanism for positioning an optical pickup used as an optical head and the like in a disk recording and reproduction apparatus in accordance with embodiment 1 of the present invention. FIG. 2 is a side view showing the floating unit 200 shown in FIG. 1.

Referring to FIGS. 1 and 2, a magneto-optical disk 4 used as a recording medium is placed and supported on a turntable 5. The turntable 5 for supporting the disk 4 is secured to the rotation shaft of a spindle motor 6 and is made rotatable. In addition, an optical pickup 8 for recording information to or reproducing information from a target track on the disk 4 is configured to move in the radial direction of the disk 4.

As shown in FIG. 1, the disk drive mechanism having the turntable 5 and the like, and the head positioning mechanism having an optical pickup 8 are provided on a substrate 1 of the floating unit 200. The substrate 1 of the floating unit 200 is suspended from a base unit 3 of the disk recording and reproduction apparatus by eight floating springs 2a, 2b, 2c, 2d, 2e, 2f, 2g, 2h (hereinafter designated by reference code 2) connected to the four corners thereof.

In addition, as shown in FIG. 1, four rods 1a, 1b, 1c, 1d secured to the substrate 1 are elastically supported by four oil dampers 14a, 14b, 14c, 14d (hereinafter designated by reference code 14), respectively, which have vibration damping effects through the use of a damping action due to the viscosity of silicone oil. These oil dampers 14 are secured to the base unit 3. The rods 1a, 1b, 1c, 1d formed on the substrate 1 are each inserted into a recess formed in each of the oil dampers 14 and supported thereby. The oil dampers 14 are configured so as to generate viscous resistance when the substrate 1 is moved relative to the base frame 3.

Furthermore, the floating unit 200 of embodiment 1 is provided with a dynamic damper 100 which will be described later. The dynamic damper 100 damps vibration generated from the drive mechanisms, so that the optical pickup 8 can be accurately positioned at a target track on the disk.

As shown in FIG. 1, two cylindrical guide shafts 7a, 7b, being parallel to each other, are installed on the substrate 1. The guide shafts 7a, 7b are extended in the axial direction of the substrate 1 (in the up-down direction in FIG. 1), and secured to the substrate 1 by holders (not shown).

A carriage 9 on which the optical pickup 8 is mounted is installed so as to be slidable in the radial direction of the disk 4 by guided with the guide shafts 7a, 7b. The carriage 9 engages a feed shaft 12 having helical grooves. When the feed shaft 12 is rotated by a stepping motor 13, the carriage 9 is moved rapidly in the radial direction of the disk 4.

A pair of coils 10a, 10b are provided near both sides of the optical pickup 8 in the axial direction of the substrate 1 (in the up-down direction in FIG. 1). Furthermore, magnets 11a, 11b are provided near the optical pickup 8 in a direction orthogonal to the axial direction on the carriage 9. With this configuration, the optical pickup 8 is accurately positioned by using the repulsive force of the magnets, whereby the optical pickup 8 can accurately trace the information-recorded track of the disk 4.

Figure 3:
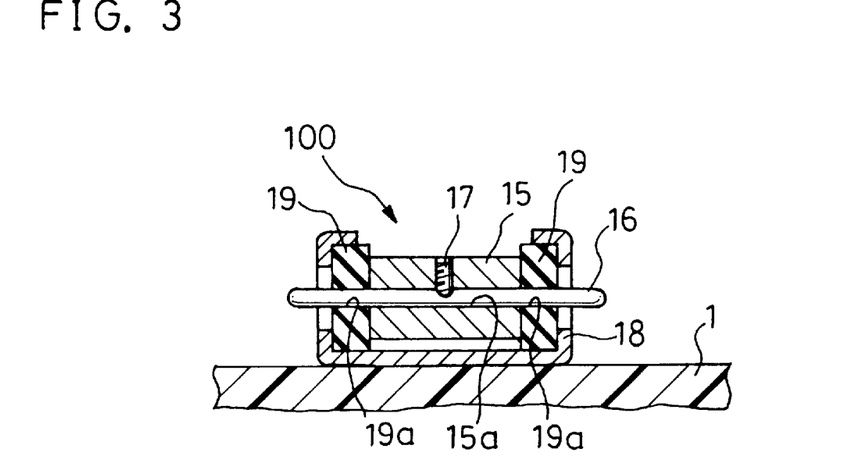
FIG. 3 is a vertical sectional view showing a dynamic damper in accordance with embodiment 1.
Figure 4:
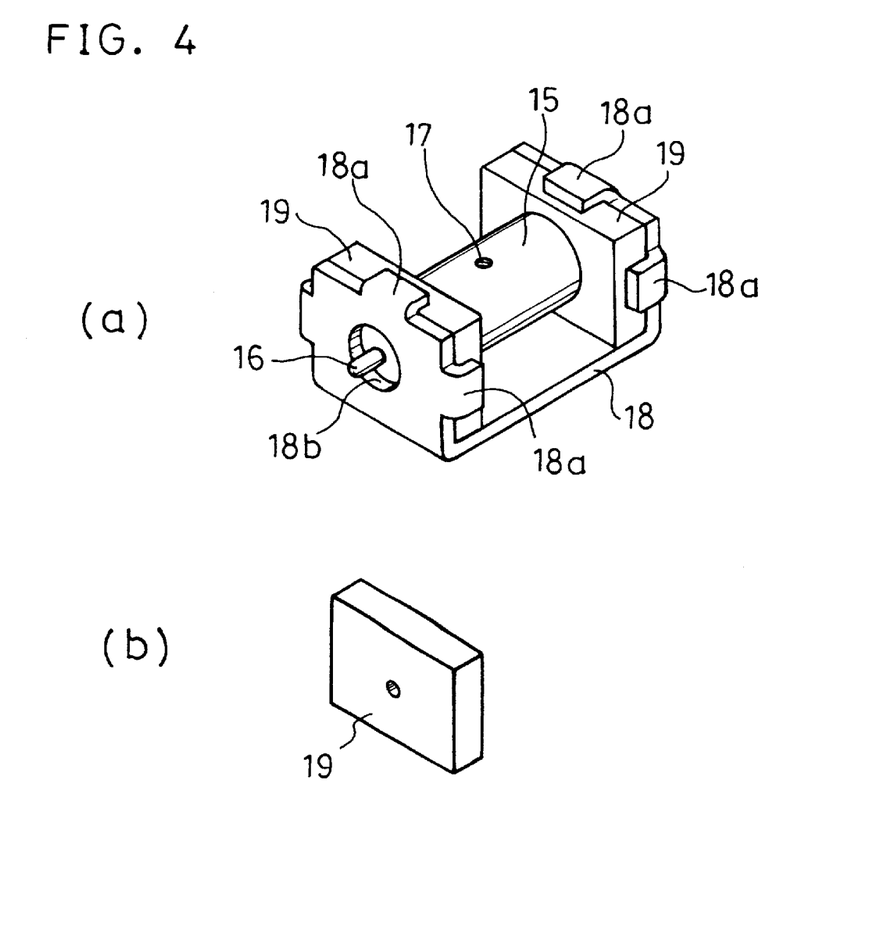
FIG. 4 is a perspective view (a) showing the dynamic damper in accordance with embodiment 1 and a perspective view (b) showing a gel member used for the dynamic damper.

Next, the configuration of the dynamic damper 100 in the disk recording and reproduction apparatus of embodiment 1 will be described below referring to FIGS. 3 and 4. FIG. 3 is a vertical sectional view showing the dynamic damper 100. The portion (a) of FIG. 4 is a perspective view showing the dynamic damper 100. The portion (b) FIG. 4 is a perspective view showing the shape of a gel member used for the dynamic damper 100.

As shown in FIG. 3 and the portion (a) of FIG. 4, the dynamic damper 100 comprises a weight 15 having a cylindrical shape, two gel members 19, 19 provided to sandwich the weight 15, and a rod 16 passing through the weight 15 and the gel members 19, 19 so as to secure them. The gel member 19 is a viscoelastic element formed of a gel-like substance (an intermediate state between liquid and solid) mainly consisting of silicone or styrene. As shown in FIG. 3, the above-mentioned weight 15, the gel members 19, 19 and the rod 16 are secured to the interior of a holder 18 having a nearly U-shaped cross-section.

In the dynamic damper 100 of embodiment 1, the holder 18 is installed on the substrate 1 so that the center axis of the weight 15 is orthogonal to the line segment extended between the rotation center of the disk 4 and the operating point of the optical pickup 8 for writing and reading information to and from the disk 4.

The gel member 19 of embodiment 1 has a shock absorption coefficient of 90% or more at ordinary temperature. The shock absorption coefficient was obtained when a steel ball (weight: 65 g, diameter: 25 mm) was dropped to the gel member 19, and vibration transmitted through the gel member 19 was measured.

As shown in FIG. 3, a through hole 15a is formed at the center of the weight 15 in the direction of the center axis thereof, and the rod 16 is inserted into the through hole 15a. The rod 16 is secured with a screw 17 which advances from the outer circumferential surface of the weight 15 in a direction orthogonal to the center axis of the weight 15.

In addition, the rod 16 is inserted into the through holes 19a, 19a formed in the gel members 19, 19 provided on both sides of the weight 15. The gel members 19, 19 are supported and secured with bent projections 18a formed on the holder 18. Furthermore, holes 18b are formed on both sides of the holder 18 so that the rod 16 passing through the gel members 19, 19 does not make contact with the holder 18. The holder 18 is installed on the substrate 1 so that the center axis of the weight 15 is orthogonal to the movement direction of the carriage 9.

Damping in a mechanical vibration system is considered here by using its equivalent circuit (see Section, for example, "Equivalent circuits of vibration systems" in the Mechanical Engineering Dictionary (First Edition) issued by Asakura-Shoten). In this case, a limit condition of transient current in an RLC direct-current circuit with respect to vibration in an electric circuit (see Section 9; Katogensho (Transient Phenomena, Chapter 1; Electric Theories in the Electric Engineering Pocket Book; Denkikougaku pocket book (Third Edition) issued by Ohm-sha, Tokyo, Japan) represents ideal vibration damping. Therefore, in order to obtain a vibration damping effect, it is desirable to properly select the gel members 19 used as viscoelastic elements and the weight 15 used as a vibrator so that the relationship between viscoelastic elements for damping and the mass of a vibrator becomes this limit condition.

Next, the operation of the dynamic damper 100 in the disk recording and reproduction apparatus of embodiment 1 will be described below.

When the transient phenomenon of vibration in the dynamic damper 100 of embodiment 1 becomes vibratory, a first resonance frequency $f_1$ determined by the spring constant of the gel member 19 used as a viscoelastic element (an elastic element having a viscosity) and the mass of the weight 15 is represented by equation 1 shown below:

$$f_1 = \frac{\sqrt{k_1/m_1}}{2\pi} \qquad (1)$$

wherein, $k_1$ is a spring constant of the gel member 19 used as a viscoelastic element, and $m_1$ is the mass of the weight 15. Therefore, the dynamic damper 100 of embodiment 1 damp vibration in a frequency range lower than the first resonance frequency $f_1$.

If the transient phenomenon of vibration is in the above-mentioned limit condition, and if vibration is caused only by the weight 15, the vibration is absorbed in a short time within period $T (=1/f_1)$ which is inversely proportional to the above-mentioned first resonance frequency $f_1$, whereby efficiency becomes very high.

Figure 5:
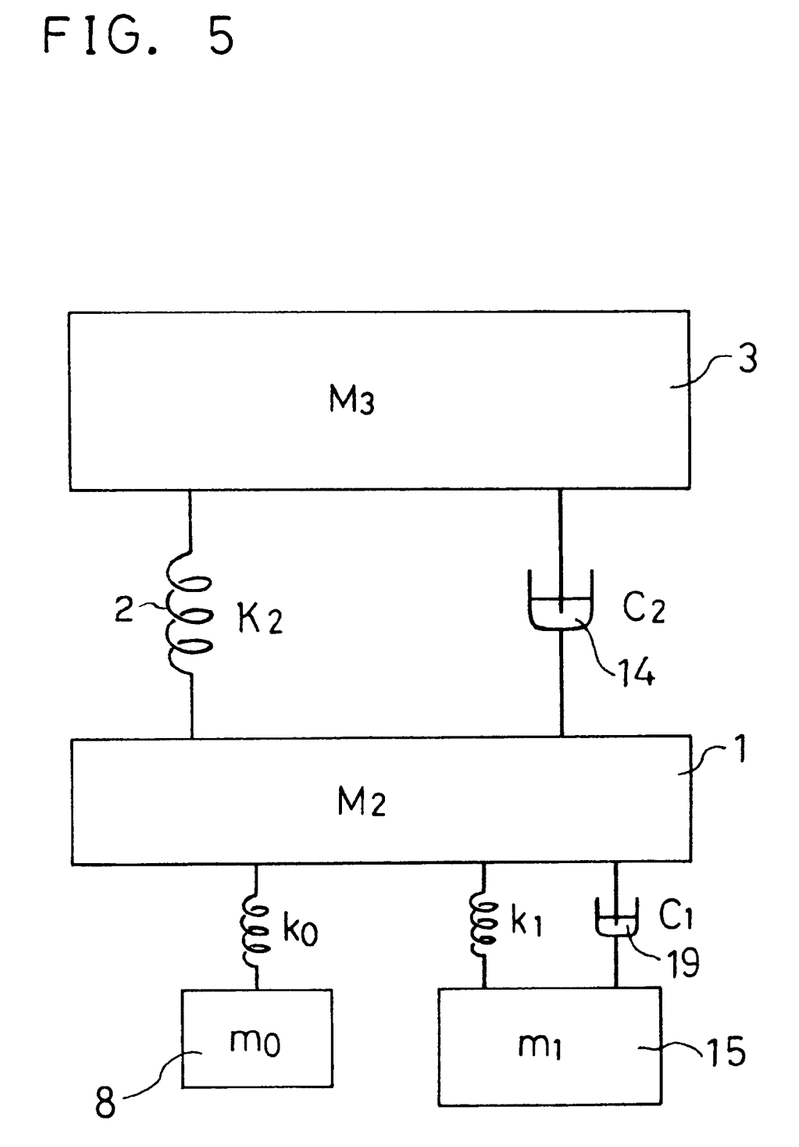
FIG. 5 is an explanation view of a vibration model of the disk recording and reproduction apparatus in accordance with embodiment 1.

FIG. 5 is a damping explanation view of a vibration model of the disk recording and reproduction apparatus in accordance with embodiment 1. Referring to FIG. 5, $M_2$ is the mass of the substrate 1 and all components disposed on the substrate 1, $K_2$ is the spring constant of the floating spring 2, $C_1$ is a viscosity coefficient of the gel member 19 of the dynamic damper 100, $C_2$ is a viscosity coefficient of the oil damper 14, $m_0$ is the mass of the optical pickup 8, and $k_0$ is the spring constant of the spring for supporting the optical pickup 8. $M_3$ is the mass of the base frame 3.

A vibration force applied to the substrate 1 when disturbance vibration is exerted to the base frame 3 is now obtained as follows.

Influence of the optical pickup 8 is negligible here, since its position is electrically controlled around its resonance frequency. Therefore, how to damp the vibration force transmitted to the substrate 1 by using the floating springs 2, the oil dampers 14 and the dynamic damper 100 is an important point to be considered.

Equation 2 described below represents a ratio of the vibration force transmitted to the substrate 1 to the vibration force applied to the base frame 3.

$$\frac{\text{Energy of Vibration transmitted to substrate 1}}{\text{Energy of Vibration input to base frame 3}} = \tag{2}$$

$$\frac{\begin{vmatrix} (m_1S^2 + C_1S + k_1) & 0 & 0 \\ -(C_1S + k_1) & 0 & -(C_2S + k_2) \\ 0 & F(S) & m_3S^2 + C_2S + k_2 \end{vmatrix}}{\begin{vmatrix} (m_1S^2 + C_1S + k_1) & -(C_1S + k_1) & 0 \\ -(C_1S + k_1) & \{m_2S^2 + (C_1 + C_2)S + k_1 + k_2\} & 0 \\ 0 & -(C_2S + K_2) & F(S) \end{vmatrix}} =$$

$$\frac{(m_1S^2 + C_1S + k_1)(C_2S + k_2)}{(m_1S^2 + C_1S + k_1)\{m_2S^2 + (C_1 + C_2)S + k_1 + k_2\} - (C_1S + k_1)^2}$$

Figure 6:
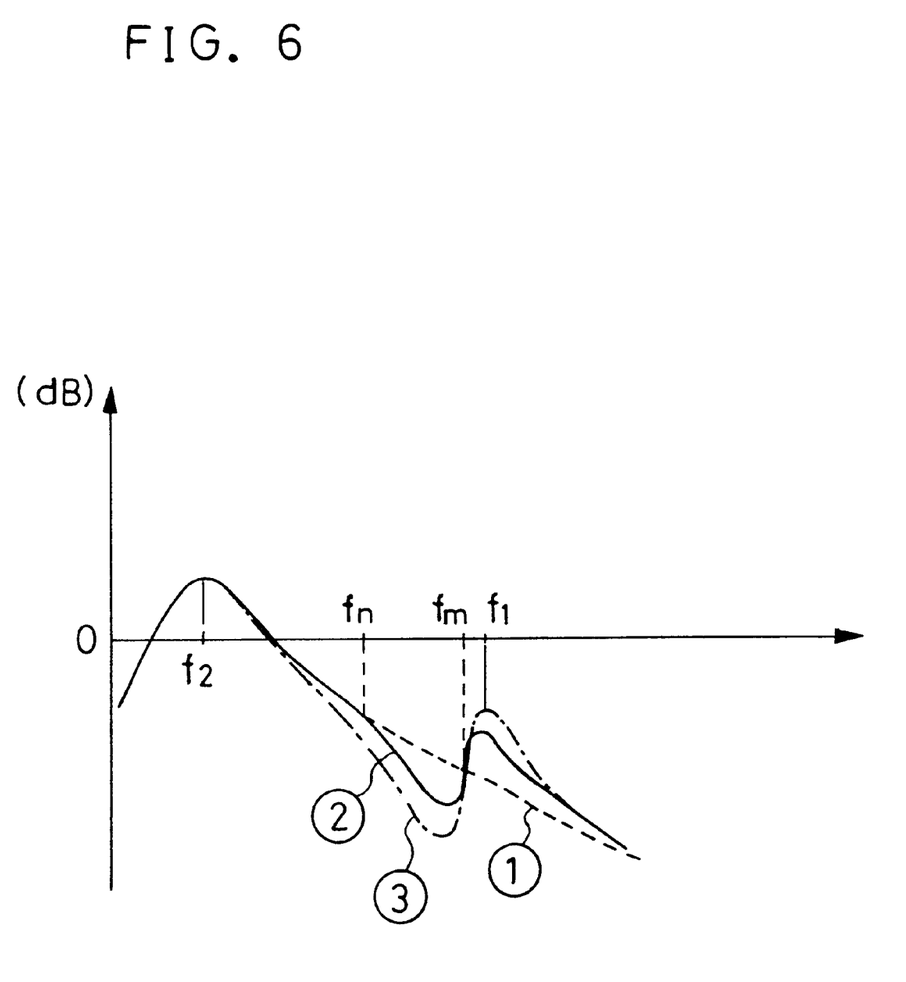
FIG. 6 is a graph showing a vibration damping characteristic of the vibration model of the disk recording and reproduction apparatus in accordance with embodiment 1.

The above-mentioned equation 2 has been represented by using Laplace transformation. FIG. 6 is a Bode diagram of equation 2, and shows a damping characteristic for turbulence vibration. In FIG. 6, the ordinate represents a damping amount (dB), and the abscissa represents a frequency (Hz).

In FIG. 6, $f_2$ is a second resonance frequency determined by the mass of the substrate 1, the spring constant of the floating spring 2 and the viscosity coefficient of the oil damper 14.

The broken line ① in FIG. 6 represents a vibration damping characteristic obtained when the floating springs 2 and the oil dampers 14 are used as vibration absorbers, and the dynamic damper 100 is not used. The solid line ② in FIG. 6 represents a vibration damping characteristic obtained when the dynamic damper 100 of embodiment 1 is used. Furthermore, the chain line ③ in FIG. 6 represents a vibration damping characteristic obtained when the weight 15 of the dynamic damper 100 is made heavier without changing the value of the amount at the second resonance frequency $f_2$. In the experiments shown in FIG. 6, the first resonance frequency $f_1$ was about 500 Hz, and the second resonance frequency $f_2$ was about 14 Hz.

As shown in FIG. 6, when the dynamic damper 100 of embodiment 1 is used, it is understood that a significant damping effect is obtained in the range between frequencies $f_n$ and $f_m$ when the dynamic damper 100 of embodiment 1 is used. In the experiments shown in FIG. 6, the frequency $f_n$ was about 100 Hz, and the frequency $f_m$ was about 450 Hz. As described above, by using the dynamic damper 100 of embodiment 1, the damping effect becomes significant in the frequency range between the first resonance frequency $f_1$ and the second resonance frequency $f_2$, which are vibration frequencies affecting the positional control of the optical pickup 8.

Furthermore, in the case that the vibration in the frequency range of a frequency lower than the first resonance frequency $f_1$ to a frequency higher than the second resonance frequency $f_2$ is desired to be damped further, it is understood that the effect of damping becomes larger when the mass of the weight 15 of the dynamic damper 100 is made heavier.

In the dynamic damper 100 of the disk recording and reproduction apparatus of embodiment 1, the weight 15 can be installed easily, and in addition, the weight 15 having a large mass can be installed securely in the dynamic damper 100 shown in FIG. 4.

When a weight having a large mass was installed in a conventional dynamic damper, installation was possible only by using methods wherein the weight was bonded via an elastic element, or inserted and molded into an elastic element. Therefore, when the bonding process was used, it was difficult to securely install the weight having a large mass, and when the insertion and molding process was used, production became complicated.

In the case of the dynamic damper 100 of the above-mentioned embodiment 1, however, the gel member 19 is shaped like a plate having a through hole as shown in (b) of FIG. 4. The weight 15 is passed through together with the gel members 19 by the rod 16 so as to be secured in the interior of the holder 18. With this method, the weight having a large mass can be installed easily in the dynamic damper 100 of embodiment 1.

As described above, in embodiment 1 of the present invention, by using the dynamic damper wherein the pair of viscoelastic elements and the weight disposed therebetween are secured to the holder, it is possible to significantly damp the vibration in the frequency range of a frequency lower than the first resonance frequency $f_1$ to a frequency higher than the second resonance frequency $f_2$, which are determined by the spring constant of the viscoelastic elements and the mass of the weight.

In the dynamic damper 100 of the disk recording and reproduction apparatus of embodiment 1, the gel members disposed on both sides of the weight have the same spring constant. However, it is possible to obtain a disk recording and reproduction apparatus capable of damping vibration at a specific frequency by using a dynamic damper wherein gel members having different spring constants are disposed on both sides of the weight.

By using the dynamic damper, a protrusion at the first resonance frequency $f_1$ as shown in FIG. 6 does not appear markedly because the viscoelastic gel members exhibit their non-linearity property. Therefore, the occurrence of a resonance phenomenon at $f_1$ is suppressed largely even with an installation of the dynamic damper.

Embodiment 2

Embodiment 2 of the disk recording and reproduction apparatus of the present invention will be described below referring to the accompanying drawings, FIGS. 7 and 8.

Figure 7:
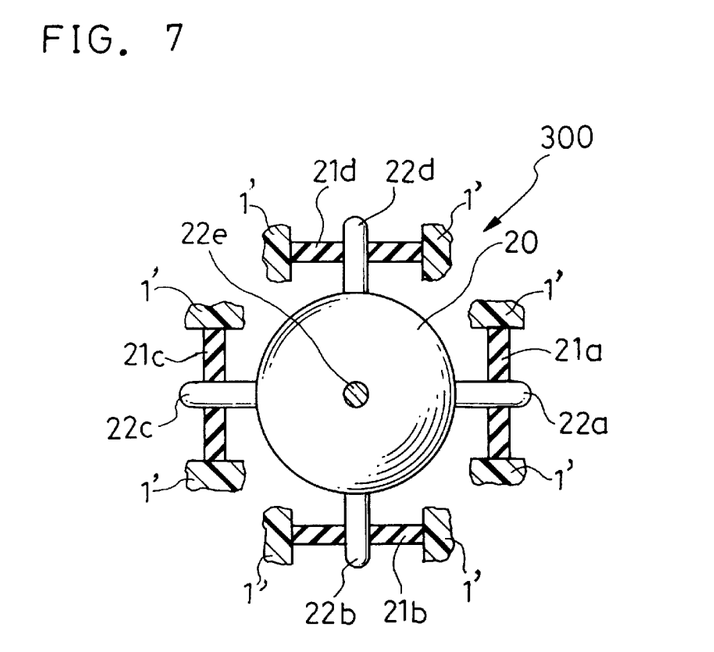
FIG. 7 is a vertical sectional view showing a dynamic damper in accordance with the disk recording and reproduction apparatus in accordance with embodiment 2.

FIG. 7 is a sectional view showing the configuration of a dynamic damper 300 in accordance with the disk recording and reproduction apparatus of embodiment 2. The basic configuration of the disk recording and reproduction apparatus of embodiment 2 is similar to that of the disk recording and reproduction apparatus of the above-mentioned embodiment 1, and the dynamic damper 300 is used instead of the dynamic damper 100 which is used in the above-mentioned embodiment 1.

Referring to FIG. 7, the dynamic damper 300 has a spherical weight 20. Arm rods 22a, 22b, 22c, 22d, 22e, 22f (two arm rods 22e and 22f provided on the forward and backward sides of the weight 20 are not shown in FIG. 7) are secured to the weight 20, and projects radially from the weight 20 at equal intervals in six directions, that is, in the up-and-down, right-and-left and back-and-forth directions of the weight 20. These arm rods 22a, 22b, 22c, 22d, 22e, 22f are supported by disk-shaped gel members 21a, 21b, 21c, 21d, 21e, 21f (two gel members 21e and 21f provided on the forward and backward sides of the weight 20 are not shown in FIG. 7). The gel members 21a, 21b, 21c, 21d, 21e, 21f are formed of a gel-like substance (an intermediate state condition between liquid and solid) mainly consisting of silicone or styrene.

In embodiment 2, the outer circumferential portions of the gel members 21a, 21b, 21c, 21d, 21e, 21f, each having a through hole, are secured to holding members 1' projecting from a substrate 1, and the through holes are passed through by the arm rods 22a, 22b, 22c, 22d, 22e, 22f so as to elastically support the weight 20.

Next, the operation of the dynamic damper 300 in the disk recording and reproduction apparatus of embodiment 2 having the above-mentioned configuration will be described below.

Figure 8:
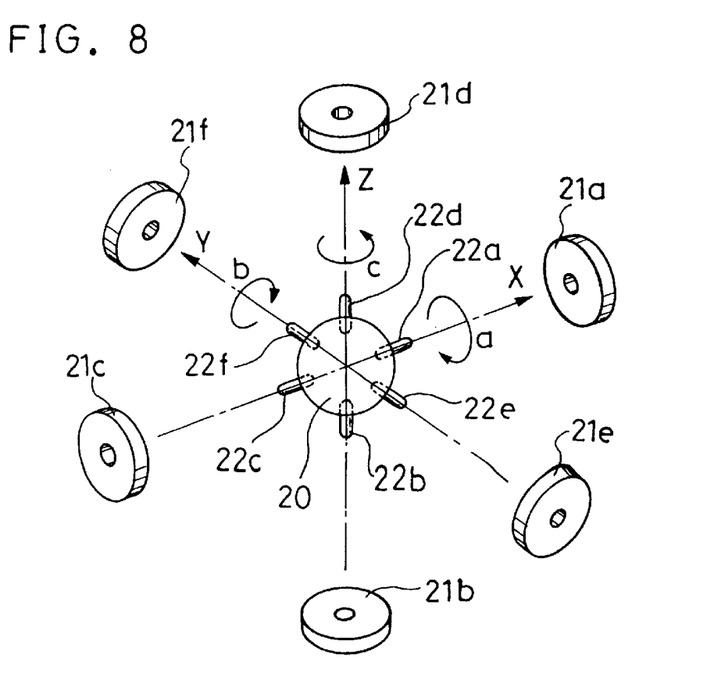
FIG. 8 is an explanation view showing directions wherein the dynamic damper in accordance with embodiment 2 performs vibration damping.

FIG. 8 is a view showing directions wherein the damping effect of the dynamic damper 300 of embodiment 2 is delivered. The gel members 21e, 21f, 21b, 21d deliver a viscoelastic effect on vibration in the X-axis direction. The gel members 21a, 21c, 21b, 21d deliver a viscoelastic effect on vibration in the Y-axis direction. The gel members 21a, 21c, 21e, 21f deliver a viscoelastic effect on vibration in the Z-axis direction.

In FIG. 8, the dynamic damper 300 of embodiment 2 also delivers a rotational vibration damping effect in the roll direction (direction a), in the pitch direction (direction b) and the yaw direction (direction c). The gel members 21e, 21b, 21f, 21d are effective in the roll direction, the gel members 21c, 21d, 21b, 21a are effective in the pitch direction, and the gel members 21e, 21a, 21f, 21c are effective in the yaw direction.

In accordance with embodiment 2, the gel members are provided in the three axial directions of the weight 20 to elastically support the weight 20 as described above, whereby linear reciprocal vibration can be damped, and rotational vibration can also be damped simultaneously.

For this reason, by installing the dynamic damper of embodiment 2 in a disk recording and reproduction apparatus provided with a head at a swing arm for a hard disk drive or the like, the disk recording and reproduction apparatus can deliver an excellent vibration damping effect.

Although gel members are used as viscoelastic elements in the description of the above-mentioned embodiment 2, even a combination of a spring and a viscous damper can also deliver an effect similar to that obtained in the above-mentioned embodiment 2.

Furthermore, although the center axes of the six arm rods disposed on the weight 20 of embodiment 2 are aligned with the intersection (origin O) of the X, Y and Z axes, it is not necessary to align the center axes with the intersection, that is, the center of gravity of the weight 20.

Moreover, although the weight 20 has a fully spherical shape in embodiment 2 as shown in FIG. 8, it is not necessary to have such a fully spherical shape. The shape of the weight 20 can be set together with the viscoelastic characteristic of the gel members depending on vibration in the X-axis, Y-axis, Z-axis, roll, pitch and yaw directions.

As described above, in the dynamic damper of the present invention, a weight having a large mass can be set in the dynamic damper comprising the gel members by using a simple configuration. Therefore, the dynamic damper can damp vibration in a wide frequency range, and can thus deliver an excellent damping effect.

Furthermore, according to the present invention, since the dynamic damper includes gel members having the non-linearity property, the dynamic damper is less likely to express the first resonance frequency $f_1$ and shows a vibration damping effect between the frequencies $f_n$ and $f_m$. Thus, the dynamic damper according to the present invention can have an exceptionally good characteristic that no care for preventing the first resonance frequency $f_1$ from being overlapped with such resonance frequencies of the structure of a floating unit becomes unnecessary during designing work.

In addition, the dynamic damper of the present invention comprising the gel members disposed in the directions of the three axes can damp linear reciprocal vibration and rotational vibration.

Furthermore, the disk recording and reproduction apparatus using the dynamic damper of the present invention has an excellent damping effect because of being capable of damping vibration in a wide frequency range.

Moreover, the disk recording and reproduction apparatus using the dynamic damper of the present invention has an excellent damping effect because of being capable of damping vibration in any directions and also being capable of damping rotational vibration.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A dynamic damper comprising:
   a weight having a predetermined mass;
   a pair of viscoelastic elements each having a predetermined spring constant and a predetermined viscosity and used to support said weight;
   a rod which passes through said weight and said viscoelastic elements and is secured to said weight; and
   a holder for being secured to a substrate, so that a center axis of said weight is orthogonal to a line segment extended between a rotation center of a disk and an operating point of a head for writing and reading information to and from said disk, said holder elastically supporting said weight and said rod via said viscoelastic elements,
   said dynamic damper being configured to damp vibration in a frequency range lower than a resonance frequency determined by the predetermined spring constant of said viscoelastic elements and the predetermined mass of said weight.

2. The dynamic damper in accordance with claim 1, wherein said weight is sandwiched between said pair of viscoelastic elements.

3. The dynamic damper in accordance with claim 1, wherein said viscoelastic elements are formed in a plate shape having a flat surface and each viscoelastic element has a through hole at the center of the flat surface thereof, said weight is formed in a cylindrical shape, and said through holes of said viscoelastic elements are passed through by said rod.

4. A dynamic damper comprising:
   a weight having a predetermined mass;
   a first viscoelastic element having a predetermined spring constant and a predetermined viscosity;
   a second viscoelastic element having a spring constant and a viscosity different from those of said first viscoelastic element, said second viscoelastic element used together with said first viscoelastic element to sandwich said weight;
   a rod which passes through said weight and said first and second viscoelastic elements and is secured to said weight; and a holder for being secured to a substrate, so that a center axis of said weight is orthogonal to a line segment extended between a rotation center of a disk and an operating point of a head for writing and reading information to and from said disk, said holder elastically supporting said weight and said rod through said first and second viscoelastic elements, said dynamic damper being configured to damp vibration in a frequency range lower than a resonance frequency determined by the spring constants of said first and second viscoelastic elements and the mass of said weight.

* * * * *